(12) United States Patent
Noya et al.

(10) Patent No.: US 6,566,009 B1
(45) Date of Patent: May 20, 2003

(54) ALKALINE BATTERY

(75) Inventors: Shigeto Noya, Neyagawa (JP); Shinichi Sumiyama, Hirakata (JP); Yasuko Hoshina, Hirakata (JP); Michiko Fujiwara, Moriguchi (JP); Yuji Mototani, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/806,447

(22) PCT Filed: Oct. 4, 1999

(86) PCT No.: PCT/JP99/05481

§ 371 (c)(1),
(2), (4) Date: Jul. 9, 2001

(87) PCT Pub. No.: WO00/21151

PCT Pub. Date: Apr. 13, 2000

(30) Foreign Application Priority Data

| Oct. 8, 1998 | (JP) | 10-286765 |
| Apr. 30, 1999 | (JP) | 11-125120 |
| Apr. 30, 1999 | (JP) | 11-125121 |
| Apr. 30, 1999 | (JP) | 11-125122 |

(51) Int. Cl.$^7$ .......... H01M 4/52; H01M 4/50; H01M 4/32
(52) U.S. Cl. .......... 429/223; 429/224
(58) Field of Search .......... 429/223, 224, 429/231.5

(56) References Cited

U.S. PATENT DOCUMENTS

| 5,342,712 | A | | 8/1994 | Mieczkowska et al. ...... 429/224 |
| 6,156,456 | A | * | 12/2000 | Izumi et al. .......... 429/223 |
| 6,225,004 | B1 | * | 5/2001 | Hayashi .......... 429/223 |
| 6,416,903 | B1 | * | 7/2002 | Fierro et al. .......... 429/223 |

FOREIGN PATENT DOCUMENTS

| JP | 53-44833 | 4/1978 |
| JP | 57-49168 | 3/1982 |
| JP | 57-72266 | 5/1982 |
| JP | 10-21904 | 1/1998 |

\* cited by examiner

Primary Examiner—Stephen Kalafut
(74) Attorney, Agent, or Firm—McDermott, Will & Emery

(57) ABSTRACT

The present invention provides an alkaline battery having good heavy-loading discharge characteristics even after long-term storage at high temperatures. The alkaline battery of the present invention comprises a positive electrode containing manganese dioxide and nickel oxyhydroxide as an active material, a negative electrode containing zinc as an active material, and an alkaline electrolyte. The positive electrode further contains at least one compound selected from the group consisting of an oxygen-containing zinc compound, an oxygen-containing calcium compound, an oxygen-containing yttrium compound, and an oxygen-containing titanium compound.

4 Claims, 1 Drawing Sheet

ALKALINE BATTERY

TECHNICAL FIELD

The present invention relates to an improved alkaline battery using manganese dioxide and nickel oxyhydroxide as positive electrode active material.

BACKGROUND ART

Alkaline batteries, for example, alkaline dry batteries, have a structure in that a cylindrical positive electrode is closely fitted in a positive electrode casing, which also functions as a positive electrode terminal, and a gel negative electrode is disposed on the center of the cylindrical positive electrode via a separator.

The equipment using these batteries has increased loading, so that batteries having excellent heavy-loading discharge characteristics have been demanded.

One proposed technique mixes nickel oxyhydroxide with a positive electrode material mixture, which constitutes the positive electrode, to provide a battery having excellent heavy-loading discharge characteristics (for example, JAPANESE LAID-OPEN PATENT PUBLICATION Sho 57-7226m6).

The proposed alkaline battery including manganese dioxide, and nickel oxyhydroxide as the positive electrode active material has poor storage performance and large self discharge especially when being stored at high temperatures, compared with the conventional alkaline dry battery without nickel oxyhydroxide. After the long-term storage, such proposed alkaline battery with nickel oxyhydroxide has poorer heavy-loading discharge characteristics than the alkaline dry battery without nickel oxyhydroxide.

DISCLOSURE OF INVENTION

The object of the present invention is thus to provide an improved alkaline battery that can maintain the good heavy-loading discharge characteristics even after the long-term storage at high temperatures.

The present invention is directed to an alkaline battery comprising a positive electrode containing manganese dioxide and nickel oxyhydroxide as an active material, a negative electrode containing zinc as an active material, and an alkaline electrolyte, wherein the positive electrode further contains at least one compound selected from the group consisting of an oxygen-containing zinc compound, an oxygen-containing calcium compound, an oxygen-containing yttrium compound, and an oxygen-containing titanium compound.

It is preferable that the content of the oxygen-containing compound is 0.1 to 10% by mole of nickel oxyhydroxide contained in the positive electrode.

It is also preferable that the oxygen-containing zinc compound is zinc oxide or zinc hydroxide, the oxygen-containing calcium compound is calcium oxide or calcium hydroxide, the oxygen-containing yttrium compound is yttrium oxide or yttrium hydroxide, and the oxygen-containing titanium compound is titanium dioxide.

It is further preferable that the positive electrode contains 20 to 90% by weight of manganese dioxide and 80 to 10% by weight of nickel oxyhydroxide.

BEST MODE FOR CARRYING OUT THE INVENTION

Figure 1:
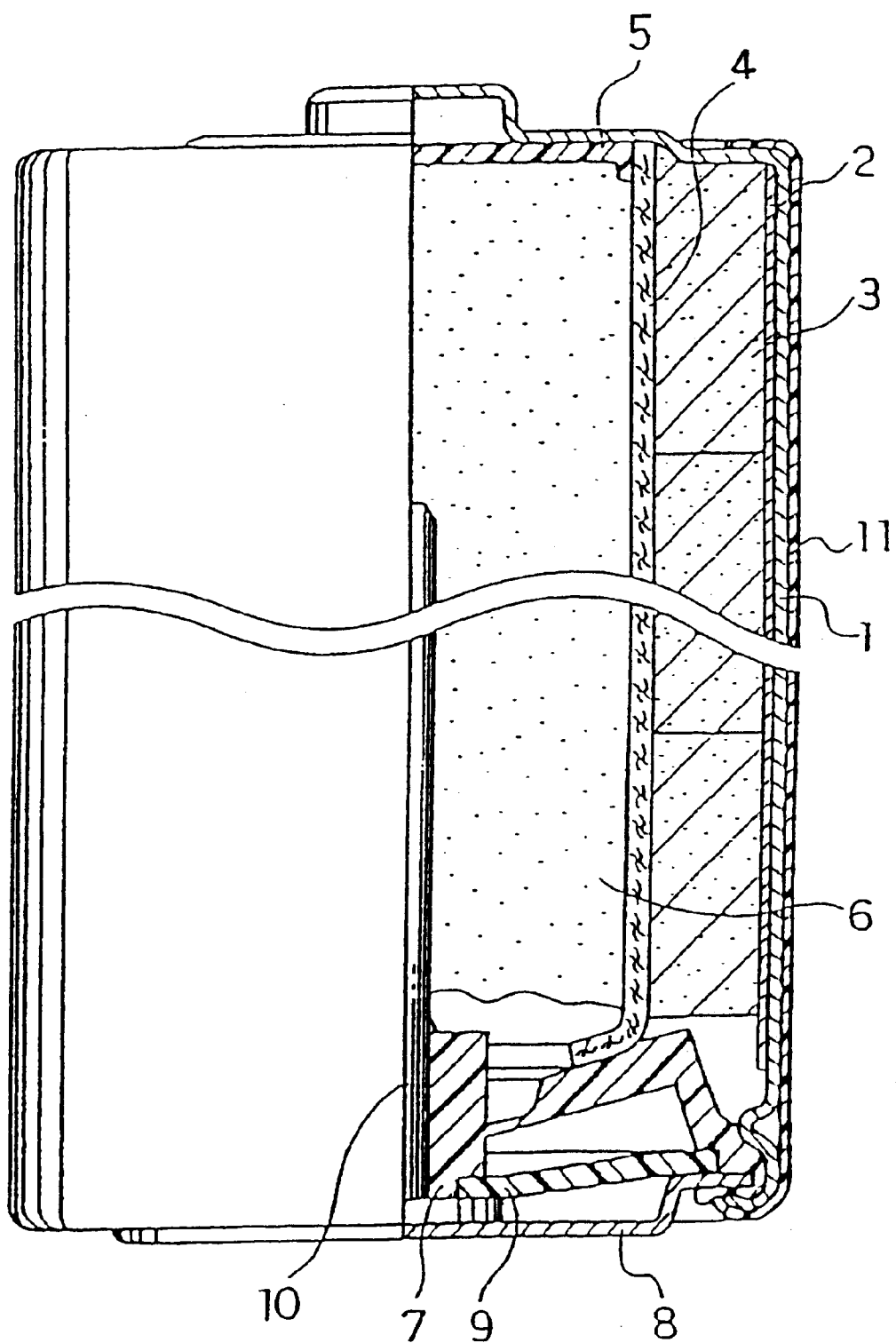
FIG. 1 is a partially sectional front view of an alkaline battery in one embodiment of the present invention.

The reduction reaction expressed as Equation (1) and the oxidation reaction expressed as Equation (2) given below simultaneously occur as the self discharge reactions of an alkaline battery using manganese dioxide and nickel oxyhydroxide as positive electrode active material. Equation (3) shows the comprehensive reaction occurring as a result:

| | | | |
|---|---|---|---|
| $NiOOH + H_2O + e^-$ | $\rightarrow$ | $Ni(OH)_2 + OH^-$ | (1) |
| $4OH^-$ | $\rightarrow$ | $2H_2O + O_2 + 4e^-$ | (2) |
| $4NiOOH + 2H_2O$ | $\rightarrow$ | $4Ni(OH)_2 + O_2$ | (3) |

Nickel oxyhydroxide soaked in an aqueous alkaline solution at high temperatures causes oxygen to be released therefrom and thereby changes to nickel hydroxide.

In order to enable the battery after storage to maintain the good heavy-loading discharge characteristics, it is required to slow the rate of the self-discharge reaction expressed as Equation (3) and avoid the deterioration of nickel oxyhydroxide. For that purpose, reducing the generation of oxygen is effective.

Adding at least one oxygen-containing compound selected from the group consisting of an oxygen-containing zinc compound, an oxygen-containing calcium compound, an oxygen-containing yttrium compound, and an oxygen-containing titanium compound to the positive electrode mixture raises the oxygen overpotential for the oxygen-generating reaction and reduces the reaction expressed as Equation (2) given above.

Among the above oxygen-containing compounds, especially an oxygen-containing zinc compound is preferable since addition of the zinc compound lowers the open circuit voltage of the battery. This is ascribed to a decrease in positive electrode potential of the battery. The positive electrode potential shifts towards negative direction, whereas the negative electrode potential does not shift. Although the reason of the decrease in positive electrode potential is not elucidated, it is thought that the decrease in positive electrode potential increases a difference between the potential at which the reaction expressed as Equation (2) given above proceeds and the positive electrode potential and thereby reduces the self discharge reaction expressed as Equation (3) given above.

When the content of the oxygen-containing compound contained in the positive electrode is 0.1 to 10% by mole of nickel oxyhydroxide contained in the positive electrode, the alkaline battery has excellent discharge characteristics at the initial stage and after storage at high temperatures. Especially when the content of the oxygen-containing compound is 0.1 to 5% by mole of the nickel oxyhydroxide, discharge characteristics at the initial stage is improved.

When the positive electrode contains 20 to 90% by weight of manganese dioxide and 80 to 10% by weight of nickel oxyhydroxide, the alkaline battery has excellent discharge characteristics at the initial stage and after storage at high temperatures. Especially when the positive electrode contains 20 to 80% by weight of manganese dioxide and 80 to 20% by weight of nickel oxyhydroxide, the alkaline battery has excellent discharge characteristics at the initial stage.

FIG. 1 is a partially sectional front view of an alkaline battery in one embodiment of the present invention.

In the present invention, a positive electrode material mixture comprising manganese dioxide, nickel oxyhydroxide and the above oxygen-containing compound is prepared in first. Then, the mixture is molded into pellet to give a positive electrode, for example.

The alkaline battery as shown in FIG. 1 may be manufactured by the following procedure, for example. A positive electrode casing 1 is made of steel plated with nickel. A graphite film coat 2 is formed inside the positive electrode casing 1. A plurality of short cylindrical pellets of positive electrode material mixture 3, which contains manganese dioxide and nickel oxyhydroxide as primary components, are charged into the positive electrode casing 1 and are closely stuck to the inner face of the positive electrode casing 1 under pressure. After a separator 4 and an insulator cap 5 are set inside the pellets of positive electrode mixture 3, an electrolyte is injected therein to swell the separator 4 and the pellets of positive electrode mixture 3. For example, a 40% by weight of potassium hydroxide aqueous solution is used for the electrolyte. After the injection, a gel negative electrode 6 is set inside the separator 4. The gel negative electrode 6 comprises, for example, sodium polyacrylate as a gelling agent, an alkaline electrolyte, and zinc powder as a negative electrode active material. A negative electrode current collector 10 integrated with a resin sealing plate 7, a bottom plate 8 functioning as a negative electrode terminal, and an insulating washer 9 is inserted into the gel negative electrode 6. An opening end of the positive electrode casing 1 is caulked with the periphery of the bottom plate 8 via an end of the sealing plate 7 to seal the opening of the positive electrode casing 1. An outer surface of the positive electrode casing 1 is covered with a jacket label 11. This completes the alkaline battery.

EXAMPLE 1

Manganese dioxide, nickel oxyhydroxide, and graphite were mixed at the weight ratio of 50 to 50 to 5, and then oxygen-containing zinc compound at an amount corresponding to 5% by mole of nickel oxyhydroxide was added thereto. After 1 part by weight of an electrolyte was admixed with 100 parts by weight of the active material (manganese dioxide and nickel oxyhydroxide), the obtained mixture was uniformly stirred and blended with a mixer and granulated to have a certain particle size. The resulting particles were molded into a hollow cylindrical form under pressure to give a positive electrode mixture "a". A 40% by weight of potassium hydroxide aqueous solution was used as the electrolyte.

A positive electrode mixture "b" was also prepared using zinc hydroxide, in place of zinc oxide.

Alkaline batteries A and B of LR6 size as shown in FIG. 1 were assembled respectively using the resulting positive electrode mixtures "a" and "b". After storage for 7 days at 60° C., the quantity of the gas generated in the alkaline battery was measured. The alkaline batteries at the initial stage and after storage for 3 days at 80° C. were also subjected to the continuous discharge by a constant current of 1000 mW at 20° C., and the discharge duration was measured until the voltage reached to a cut-off voltage of 0.9 V.

EXAMPLE 2

In the same manner as Example 1, except that calcium oxide and calcium hydroxide were used respectively in place of zinc oxide and zinc hydroxide, positive electrode mixtures "c" and "d" were prepared. Alkaline batteries C and D were assembled respectively using the positive electrode mixtures "c" and "d", and the quantity of the gas evolved and the discharge duration were measured for each alkaline battery.

EXAMPLE 3

In the same manner as Example 1, except that yttrium oxide and yttrium hydroxide were used respectively in place of zinc oxide and zinc hydroxide, positive electrode mixtures "e" and "f" were prepared. Alkaline batteries E and F were assembled respectively using the positive electrode mixtures "e" and "f", and the quantity of the gas evolved and the discharge duration were measured for each alkaline battery.

EXAMPLE 4

In the same manner as Example 1, except that titanium dioxide was used in place of zinc oxide, a positive electrode mixture "g" was prepared. An alkaline battery G using the positive electrode mixture "g" was assembled, and the quantity of the gas evolved and the discharge duration were measured for the alkaline battery.

Comparative Example 1

A positive electrode mixture "h", which contained manganese dioxide, nickel oxyhydroxide, and graphite at the weight ratio of 50 to 50 to 5, was prepared in the same manner as Example 1, except that zinc oxide was not added to a mixture.

Positive electrode mixtures "I", "j" and "k" were prepared in the same manner as Example 1, except that bismuth oxide, indium oxide, and cadmium oxide were used respectively in place of zinc oxide.

In the same manner as Example 1, alkaline batteries H, I, J, and K were assembled respectively using the positive electrode mixtures "h", "I", "j", and "k", and the quantity of the gas evolved and the discharge duration were measured for each alkaline battery.

Table 1 shows the quantity of the gas evolved and the discharge duration for the batteries A through K. Both the quantity of the gas evolved and the discharge duration in Table 1 are mean values of ten batteries. These values are shown as relative values when the quantity of the evolved gas and the discharge duration at the initial stage with regard to the battery H are set equal to 100.

TABLE 1

| | | | | Duration time | |
| | Batteries | Oxygen-containing compound | Quantity of gas at 60° C. | Initial stage | After storage for 3 days at 80° C. |
| --- | --- | --- | --- | --- | --- |
| Ex. | A | ZnO | 80 | 101 | 68 |
| | B | Zn(OH)$_2$ | 82 | 102 | 65 |
| | C | CaO | 79 | 106 | 57 |
| | D | Ca(OH)$_2$ | 79 | 103 | 67 |
| | E | Y$_2$O$_3$ | 82 | 105 | 57 |
| | F | Y(OH)$_3$ | 81 | 104 | 56 |
| | G | TiO$_2$ | 75 | 104 | 58 |
| Com. Ex. | H | No additive | 100 | 100 | 37 |
| | I | Bi$_2$O$_3$ | 150 | 98 | 30 |
| | J | In$_2$O$_3$ | 75 | 100 | 48 |
| | K | CdO | 110 | 99 | 44 |

Cut-off voltage = 0.9 V

As apparent from Table 1, the quantities of the gas evolved with regard to the batteries A through G, in which zinc oxide, zinc hydroxide, calcium oxide, calcium hydroxide, yttrium oxide, yttrium hydroxide, and titanium dioxide are respectively added to the positive electrode mixture, are less than the quantity of the gas evolved with regard to the battery H with no additives. The batteries A through G have the longer discharge duration after storage than the batteries H through K.

The battery I with bismuth oxide added thereto has a voltage decrease due to an internal short circuit. Although the batteries J and K have improved discharge characteristics after storage, compared with the battery H, the improvement is not sufficient as the batteries A through G.

EXAMPLE 5

The amount of zinc oxide added to the positive electrode mixture was examined. Manganese dioxide, nickel oxyhydroxide, and graphite were mixed at the weight ratio of 50 to 50 to 5, and then the respective amounts of zinc oxide specified in Table 2 (molar ratio relative to nickel oxyhydroxide) were added thereto. Positive electrode mixtures were prepared and batteries were assembled in the same manner as Example 1.

The discharge duration of each resulting battery was measured at the initial stage and after storage for 3 days at 80° C. in the same manner as Example 1. Table 2 shows the results of the measurement.

TABLE 2

| Amount of zinc oxide | Duration time | |
|---|---|---|
| (% by mole) | Initial stage | After storage for 3 days at 80° C. |
| 0.0 | 100 | 37 |
| 0.1 | 101 | 45 |
| 1.0 | 102 | 54 |
| 2.0 | 106 | 60 |
| 5.0 | 101 | 68 |
| 10.0 | 97 | 66 |
| 15.0 | 85 | 50 |

Cut-off voltage = 0.9 V

EXAMPLE 6

The amount of calcium oxide added to the positive electrode mixture was examined. Manganese dioxide, nickel oxyhydroxide, and graphite were mixed at the weight ratio of 50 to 50 to 5, and then the respective amounts of calcium oxide specified in Table 3 (molar ratio relative to nickel oxyhydroxide) were added thereto. Positive electrode mixtures were prepared and batteries were assembled in the same manner as Example 1.

The discharge duration of each resulting battery was measured at the initial stage and after storage for 3 days at 80° C. in the same manner as Example 1. Table 3 shows the results of the measurement.

TABLE 3

| Amount of calcium | Duration time | |
|---|---|---|
| oxide (% by mole) | Initial stage | After storage for 3 days at 80° C. |
| 0.0 | 100 | 37 |
| 0.1 | 101 | 45 |
| 1.0 | 104 | 52 |
| 2.0 | 108 | 63 |
| 5.0 | 103 | 70 |
| 10.0 | 99 | 69 |
| 15.0 | 90 | 49 |

Cut-off voltage = 0.9 V

EXAMPLE 7

The amount of yttrium oxide added to the positive electrode mixture was examined. Manganese dioxide, nickel oxyhydroxide, and graphite were mixed at the weight ratio of 50 to 50 to 5, and then the respective amounts of yttrium oxide specified in Table 4 (molar ratio relative to nickel oxyhydroxide) were added thereto. Positive electrode mixtures were prepared and batteries were assembled in the same manner as Example 1.

The discharge duration of each resulting battery was measured at the initial stage and after storage for 3 days at 80° C. in the same manner as Example 1. Table 4 shows the results of the measurement.

TABLE 4

| Amount of yttrium | Duration time | |
|---|---|---|
| oxide (% by mole) | Initial stage | After storage for 3 days at 80° C. |
| 0.0 | 100 | 37 |
| 0.1 | 102 | 44 |
| 1.0 | 104 | 53 |
| 2.0 | 107 | 62 |
| 5.0 | 102 | 69 |
| 10.0 | 95 | 68 |
| 15.0 | 87 | 48 |

Cut-off voltage = 0.9 V

EXAMPLE 8

The amount of titanium dioxide added to the positive electrode mixture was examined. Manganese dioxide, nickel oxyhydroxide, and graphite were mixed at the weight ratio of 50 to 50 to 5, and then the respective amounts of titanium dioxide specified in Table 5 (molar ratio relative to nickel oxyhydroxide) were added thereto. Positive electrode mixtures were prepared and batteries were assembled in the same manner as Example 1.

The discharge duration of each resulting battery was measured at the initial stage and after storage for 3 days at 80° C. in the same manner as Example 1. Table 5 shows the results of the measurement.

TABLE 5

| Amount of titanium | Duration time | |
|---|---|---|
| dioxide (% by mole) | Initial stage | After storage for 3 days at 80° C. |
| 0.0 | 100 | 37 |
| 0.1 | 103 | 47 |
| 1.0 | 105 | 53 |
| 2.0 | 109 | 65 |
| 5.0 | 105 | 72 |
| 10.0 | 100 | 70 |
| 15.0 | 89 | 51 |

Cut-off voltage = 0.9 V

Each discharge duration in Table 2 to 5 is a mean value of ten batteries, and is shown as a relative value when the discharge duration of the battery H at the initial stage is set equal to 100.

As clearly shown in Tables 2 through 5, the batteries, in which zinc oxide, calcium oxide, yttrium oxide, and titanium dioxide are added respectively at the ratios of 0.1 to 15% by mole relative to nickel oxyhydroxide contained in the positive electrode, have improved discharge characteristics after storage at the high temperature, compared with the battery H with no additives.

Addition of zinc oxide, calcium oxide, yttrium oxide, or titanium dioxide at the ratio of 15% by mole decreases the rate of the positive electrode active material contained in the pellets obtained by a predetermined method, therefore the discharge duration was shortened at the initial stage.

The amount of nickel oxyhydroxide contained in the positive electrode mixture was examined.

Comparative Example 2

Manganese dioxide, nickel oxyhydroxide, and graphite were mixed at the mixing rates specified in Table 6. Positive electrode mixtures were prepared with adding none of oxygen-containing zinc compounds, oxygen-containing calcium compounds, oxygen-containing yttrium compounds, and oxygen-containing titanium compounds, and batteries No. 1 through No. 8 were assembled using the mixtures in the same manner as Example 1.

The discharge duration was measured at the initial stage and after storage for 3 days at 80° C. with regard to the batteries No. 1 through No. 8 in the same manner as Example 1. Table 6 shows the results of the measurement. Each discharge duration in Table 6 is a mean value of ten batteries, and is shown as a relative value when the discharge duration of the battery No. 1 at the initial stage is set equal to 100.

TABLE 6

| Battery No. | Positive electrode mixture (weight ratio) | | | Duration time | |
|---|---|---|---|---|---|
| | Manganese dioxide | Nickel oxy-hydroxide | Graphite | Initial stage | After storage for 3 days at 80° C. |
| 1 | 100 | 0 | 5 | 100 | 37 |
| 2 | 95 | 5 | 5 | 102 | 38 |
| 3 | 90 | 10 | 5 | 108 | 46 |
| 4 | 80 | 20 | 5 | 129 | 63 |
| 5 | 50 | 50 | 5 | 145 | 72 |
| 6 | 20 | 80 | 5 | 159 | 73 |
| 7 | 10 | 90 | 5 | 170 | 52 |
| 8 | 0 | 100 | 5 | 169 | — |

Cut-off voltage = 0.9 V

EXAMPLE 9

Manganese dioxide, nickel oxyhydroxide, and graphite were mixed at the mixing rates specified in Table 7. Positive electrodes were prepared with adding zinc oxide to the mixtures at the ratio of 5% by mole of nickel oxyhydroxide, and batteries No. 9 through No. 15 were assembled in the same manner as Example 1.

The discharge duration was measured at the initial stage and after storage for 3 days at 80° C. with regard to the batteries No. 9 through No. 15 in the same manner as Example 1. Table 7 shows the results of the measurement.

TABLE 7

| Battery No. | Positive electrode mixture (weight ratio) | | | Duration time | |
|---|---|---|---|---|---|
| | Manganese dioxide | Nickel oxy-hydroxide | Graphite | Initial stage | After storage for 3 days at 80° C. |
| 9 | 95 | 5 | 5 | 101 | 50 |
| 10 | 90 | 10 | 5 | 108 | 59 |
| 11 | 80 | 20 | 5 | 133 | 79 |
| 12 | 50 | 50 | 5 | 152 | 93 |
| 13 | 20 | 80 | 5 | 163 | 96 |

TABLE 7-continued

| Battery No. | Positive electrode mixture (weight ratio) | | | Duration time | |
|---|---|---|---|---|---|
| | Manganese dioxide | Nickel oxy-hydroxide | Graphite | Initial stage | After storage for 3 days at 80° C. |
| 14 | 10 | 90 | 5 | 165 | 90 |
| 15 | 0 | 100 | 5 | 162 | 86 |

Cut-off voltage = 0.9 V

EXAMPLE 10

Manganese dioxide, nickel oxyhydroxide, and graphite were mixed at the mixing rates specified in Table 8. Positive electrodes were prepared with adding calcium oxide to the mixture at the ratio of 5% by mole of nickel oxyhydroxide, and batteries No. 16 through No. 22 were assembled in the same manner as Example 1.

The discharge duration was measured at the initial stage and after storage for 3 days at 80° C. with regard to the batteries No. 16 through No. 22 in the same manner as Example 1. Table 8 shows the results of the measurement.

TABLE 8

| Battery No. | Positive electrode mixture (weight ratio) | | | Duration time | |
|---|---|---|---|---|---|
| | Manganese dioxide | Nickel oxy-hydroxide | Graphite | Initial stage | After storage for 3 days at 80° C. |
| 16 | 95 | 5 | 5 | 103 | 50 |
| 17 | 90 | 10 | 5 | 108 | 59 |
| 18 | 80 | 20 | 5 | 132 | 84 |
| 19 | 50 | 50 | 5 | 158 | 97 |
| 20 | 20 | 80 | 5 | 167 | 98 |
| 21 | 10 | 90 | 5 | 165 | 90 |
| 22 | 0 | 100 | 5 | 160 | 87 |

Cut-off voltage = 0.9 V

EXAMPLE 11

Manganese dioxide, nickel oxyhydroxide, and graphite were mixed at the mixing rates specified in Table 9. Positive electrodes were prepared with adding yttrium oxide to the mixtures at the ratio of 5% by mole of nickel oxyhydroxide, batteries No. 23 through No. 29 were assembled in the same as Example 1.

The discharge duration was measured at the initial stage and after storage for 3 days at 80° C. with regard to the batteries No. 23 through No. 29 in the same manner as Example 1. Table 9 shows the results of the measurement.

TABLE 9

| Battery No. | Positive electrode mixture (weight ratio) | | | Duration time | |
|---|---|---|---|---|---|
| | Manganese dioxide | Nickel oxy-hydroxide | Graphite | Initial stage | After storage for 3 days at 80° C. |
| 23 | 95 | 5 | 5 | 102 | 51 |
| 24 | 90 | 10 | 5 | 107 | 58 |
| 25 | 80 | 20 | 5 | 130 | 82 |
| 26 | 50 | 50 | 5 | 160 | 95 |

TABLE 9-continued

| Battery No. | Positive electrode mixture (weight ratio) | | | Duration time | |
|---|---|---|---|---|---|
| | Manganese dioxide | Nickel oxy-hydroxide | Graphite | Initial stage | After storage for 3 days at 80° C. |
| 27 | 20 | 80 | 5 | 165 | 97 |
| 28 | 10 | 90 | 5 | 164 | 89 |
| 29 | 0 | 100 | 5 | 162 | 85 |

Cut-off voltage = 0.9 V

EXAMPLE 12

Manganese dioxide, nickel oxyhydroxide, and graphite were at the mixing rates specified in Table 10. Positive electrodes were prepared with adding titanium dioxide to the mixture at the ratio of 5% by mole of nickel oxyhydroxide, and batteries No. 30 through No. 36 were assembled in the same manner as Example 1.

The discharge duration was measured at the initial stage and ater storage for 3 days at 80° C. with regard to the batteries No. 30 through No. 36 in the same manner as Example 1. Table 10 shows the results of the measurement.

TABLE 10

| Battery No. | Positive electrode mixture (weight ratio) | | | Duration time | |
|---|---|---|---|---|---|
| | Manganese dioxide | Nickel oxy-hydroxide | Graphite | Initial stage | After storage for 3 days at 80° C. |
| 30 | 95 | 5 | 5 | 104 | 51 |
| 31 | 90 | 10 | 5 | 107 | 58 |
| 32 | 80 | 20 | 5 | 133 | 87 |
| 33 | 50 | 50 | 5 | 157 | 98 |
| 34 | 20 | 80 | 5 | 168 | 99 |
| 35 | 10 | 90 | 5 | 164 | 91 |
| 36 | 0 | 100 | 5 | 162 | 88 |

Cut-off voltage = 0.9 V

Each discharge duration in Table 7 to 10 is a mean value of ten batteries, and is shown as a relative value when the discharge duration of the battery No. 1 at the initial stage is set equal to 100.

As apparent from Tables 6 through 10, irrespective of the amount of nickel oxyhydroxide contained in the positive electrode, the batteries No. 9 through No. 36 with addition of zinc oxide, calcium oxide, yttrium oxide or titanium dioxide have improved discharge characteristics after storage at the high temperature, compared with the batteries No. 1 through No. 8 with adding none of zinc oxide, calcium oxide, yttrium oxide, and titanium dioxide.

Especially when the positive electrode contains 20 to 90% by weight of manganese dioxide and 80 to 10% by weight of nickel oxyhydroxide, the resulting battery has excellent discharge characteristics at the initial stage and after storage. The content of nickel oxyhydroxide equal to 20 to 80% by weight shows the remarkable improvement after the storage.

The discharge characteristics at the initial stage is improved in proportion to the amount of nickel oxyhydroxide in the positive electrode. When the content of nickel oxyhydroxide becomes equal to or greater than 90% by weight, however, the quantity of addition of zinc oxide, calcium oxide, yttrium oxide or titanium dioxide undesirably increases. This decreases the rate of the positive electrode active material contained in the positive electrode obtained by a predetermined method, thereby shortening the discharge duration.

There was a leak of the solution in the battery No. 8 by the production of oxygen due to self discharge of nickel oxyhydroxide.

INDUSTRIAL APPLICABILITY

As described above, the present invention suppresses the self discharge reaction of the alkaline battery having manganese dioxide and nickel oxyhydroxide contained in its positive electrode and effectively maintains good heavy-loading discharge characteristics even after storage.

What is claimed is:

1. An alkaline battery comprising a positive electrode containing manganese dioxide and nickel oxyhydroxide as active materials, a negative electrode containing zinc as an active material, and an alkaline electrolyte, wherein said positive electrode further contains at least one compound selected from the group consisting of an oxygen-containing zinc compound, an oxygen-containing calcium compound, an oxygen-containing yttrium compound, and an oxygen-containing titanium compound.

2. An alkaline battery in accordance with claim 1, wherein a content of said oxygen-containing compound is 0.1 to 10% by mole of nickel oxyhydroxide contained in said positive electrode.

3. An alkaline battery in accordance with claim 1, wherein said oxygen-containing zinc compound is zinc oxide or zinc hydroxide, said oxygen-containing calcium compound is calcium oxide or calcium hydroxide, said oxygen-containing yttrium compound is yttrium oxide or yttrium hydroxide, said oxygen-containing titanium compound is titanium dioxide.

4. An alkaline battery in accordance with claim 1, wherein said positive electrode contains 20 to 90% by weight of manganese dioxide and 80 to 10% by weight of nickel oxyhydroxide.

* * * * *